UNITED STATES PATENT OFFICE.

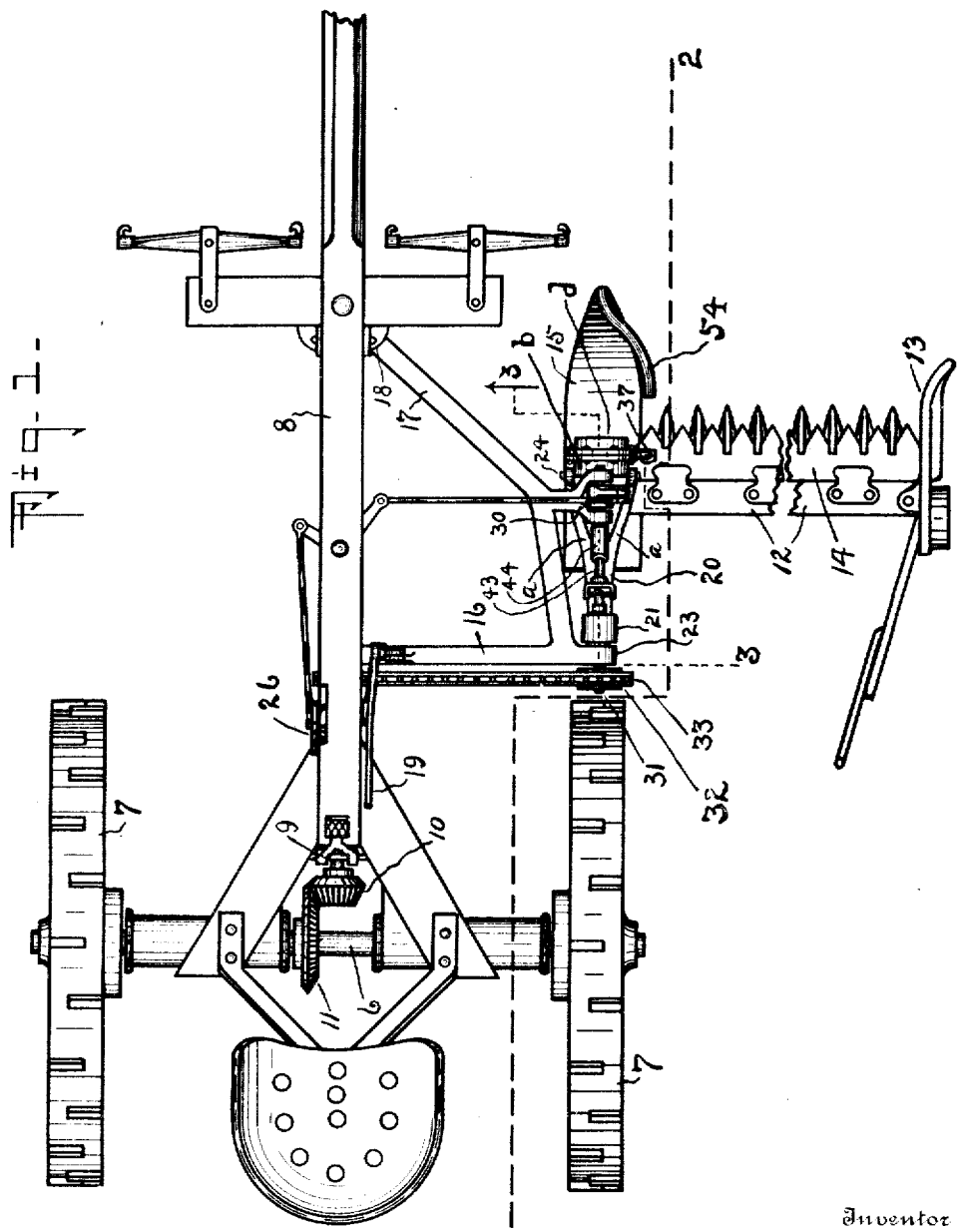

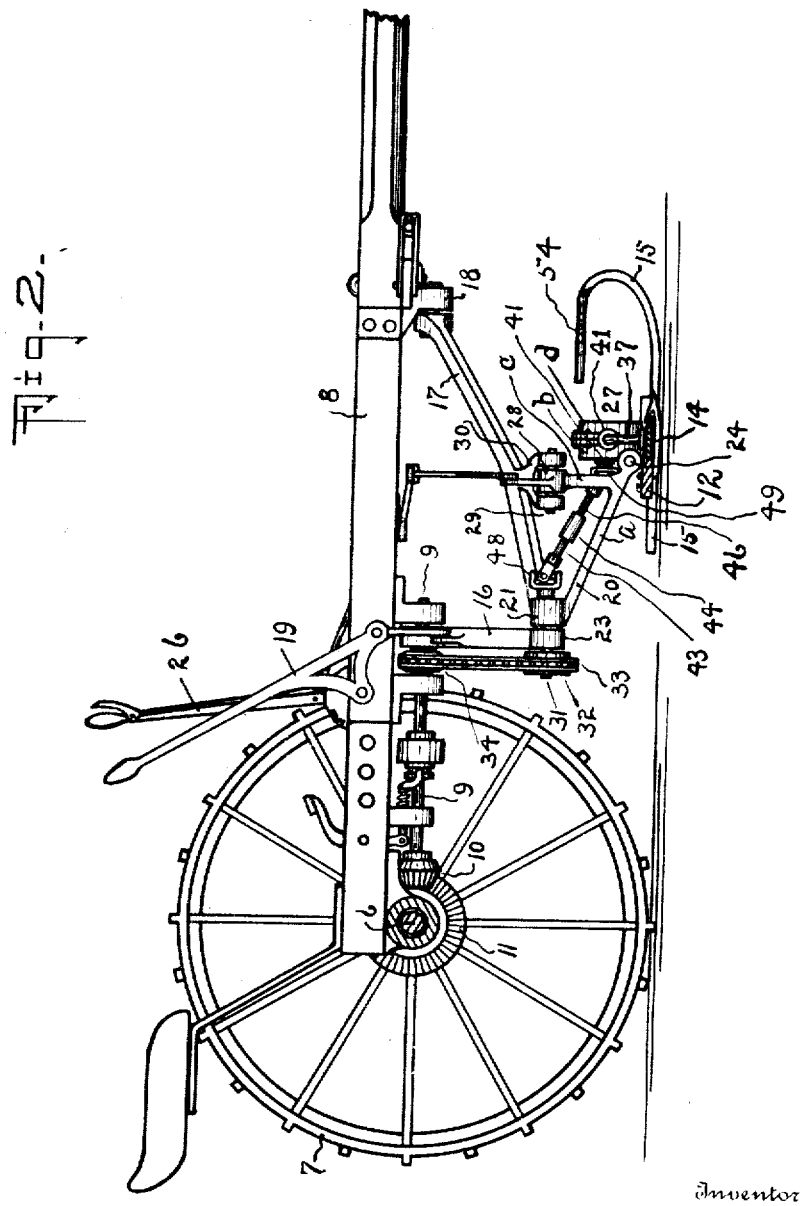

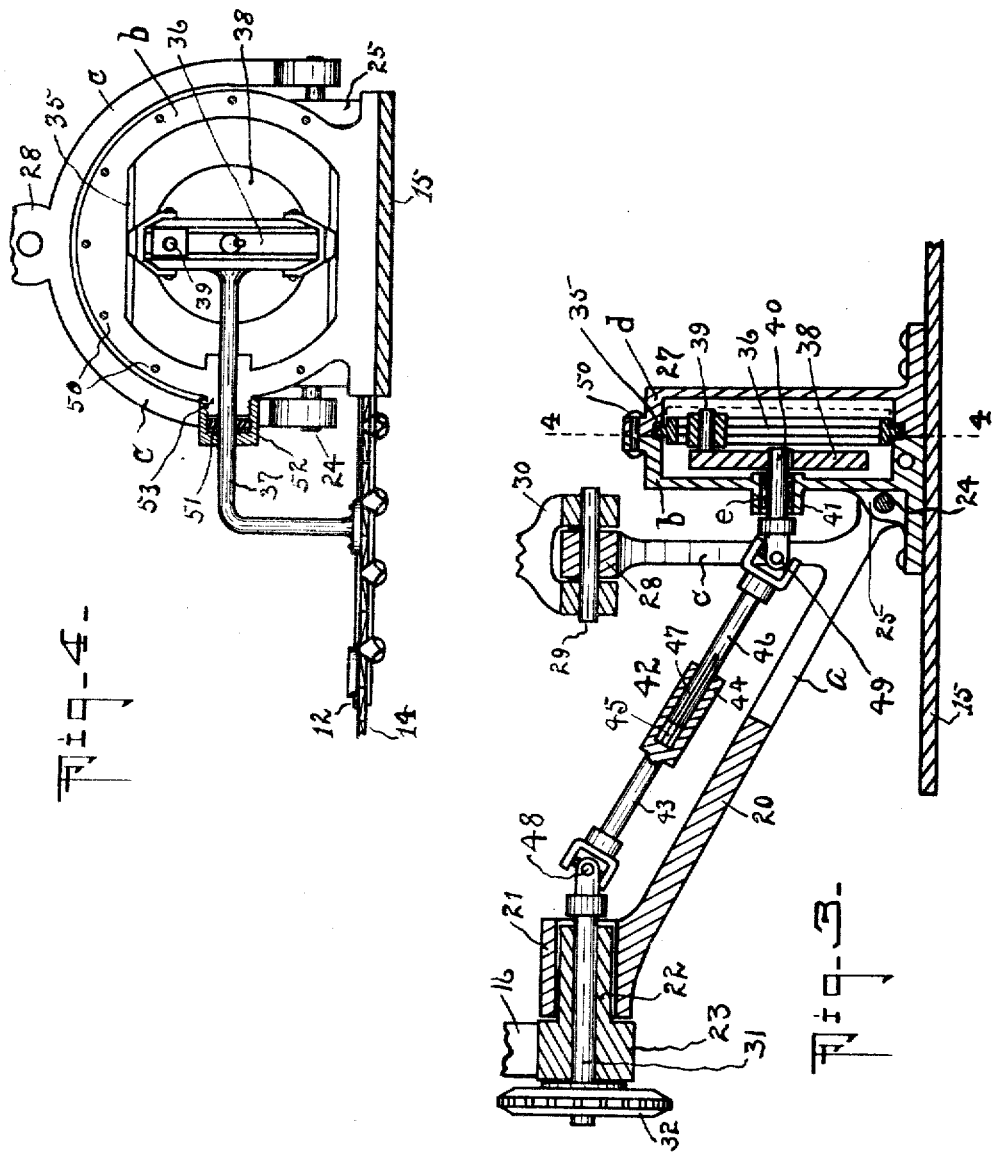

GEORGE A. GARRETT, OF GLENWOOD, IOWA.

MOWING-MACHINE.

1,287,666.   Specification of Letters Patent.   Patented Dec. 17, 1918.

Application filed August 29, 1917.   Serial No. 188,813.

*To all whom it may concern:*

Be it known that I, GEORGE A. GARRETT, a citizen of the United States, residing at Glenwood, in the county of Mills and State of Iowa, have invented certain new and useful Improvements in Mowing-Machines, of which the following is a specification.

This invention relates to an improvement in mowing machines, and has for its object to provide such a construction that either or both ends of the finger-bar may be disposed dependingly upon the ground, thereby permitting longitudinal inclination of the bar corresponding to the ground surface.

It is well known that when a mowing machine of ordinary construction is in use upon ground which is rough or in which pockets or depressions have been formed, the inner end of the finger-bar will generally be disposed some distance above the ground, with the result that a considerable part of the grass or other crop, or that part near the ground, will remain as stubble. By use of the herein described construction, the inner end of the finger-bar will be supported in the same manner as the outer end, and therefore, grass, alfalfa or the like may be severed closer to the ground than formerly.

The invention has reference to such a construction and arrangement of parts that durability may be attained and that operation will be convenient, also to such a construction that the operating parts will be few and simple so that manufacture will be practical and economical.

The novel features of the invention are illustrated in the accompanying drawings, wherein, Figure 1 is a plan view of a mowing machine with the improvement applied. Fig. 2 is a sectional view on line 2—2 of Fig. 1. Figs. 3 and 4 are enlarged details. Fig. 3 is a sectional view through a part of the movable underframe, housing-receptacle and shoe, on line 3—3 of Fig. 1, the box for a shaft being in section. Fig. 4 shows the interior of the housing-receptacle and parts therein for reciprocating the knife, as a vertical section on line 4—4 of Fig. 3.

Referring now to the drawing for a more particular description numerals 6, 7 and 8 indicate, respectively, the revoluble axle, the wheels and tongue of a mowing machine, the horizontal driving shaft 9, and its miter gear 10 in engagement with the miter gear 11 of the axle, all being of ordinary construction, the front end of the shaft having bearings in suitable brackets, best shown in Fig. 2.

Also the finger-bar 12 and track-clearer 13 carried by its outer end, and the knife 14 may be of ordinary construction. In order that the finger-bar, and particularly the inner end thereof, may be supported dependingly upon the ground, I provide certain devices to be described, consisting, in part, of a shoe 15 disposed in line with the "off" wheel of the mowing machine, the inner end of the finger-bar being secured to the shoe by any suitable means, to be maintained at right angles thereto.

In order that the shoe may rest upon the ground during operation, and that transverse stresses directed to the finger-bar may be adequately sustained, and also that the finger-bar and shoe may have swinging movements transversely of the line of travel of the machine, during operation, and that the shoe and finger-bar may be under control of an operator and may be elevated when obstructions are encountered, an underframe is provided, and best shown in Fig. 3.

In order that the underframe and parts carried thereby may be elevated when the machine is driven upon highways or from one field to another, an overframe of substantially U-shape is provided, its rear arm 16 being arranged to swing from the shaft 9, and its front arm 17 having a pivotal mounting upon a bracket 18 carried by the tongue; and by use of a suitably mounted hand-lever 19, the over-frame mentioned may be elevated or lowered.

The underframe is substantially of L-shape, and consists preferably of an arm 20 provided at its rear end, as best shown in Fig. 3, with a sleeve 21 loosely mounted on the hub 22 of the boss 23 of the arm 16, its front end being provided with branches, *a* for a mounting, at their front ends, upon a bolt 24, said bolt being mounted in suitable brackets 25 (Fig. 3) of a casting which forms a half-part *b* of a housing-receptacle 27 which is secured to the shoe 15, the remaining part of the underframe consisting of the pair of curved or arcuate arms *c* which project upwardly from arms *a*, the upper ends of arms *c* being connected by means of a boss 28 which is pivotally connected by means of a bolt 29 to a knuckle 30 with which the U-shaped overframe is provided.

On account of the pivotal mounting provided by the bolt 24, the shoe 15 and finger-bar may have a limited swinging movement longitudinally of the line of travel of the machine, this being desirable so that the finger-bar may enter depressions to advantage. On account of the pivotal connection provided by the bolt 29 and the hub 22, the underframe permits the finger-bar to have swinging movements transversely of the line of travel, this being of advantage so that either end of the finger-bar may be disposed in a depression, the finger-bar being adapted to move nearer to the ground than by any other construction.

Numeral 31 indicates a stub-shaft having bearings in the boss 23 and hub 22, its inner end being provided with a sprocket wheel 32; and by means of a sprocket chain 33, driven by the sprocket wheel 34, the shaft 31 is rotated for reciprocating the knife 14.

The housing-receptacle 27 preferably consists of the two cup-members *b* and *d* providing the horizontal grooves or guides 35, as best shown in Fig. 3, as bearings for a shuttle-head 36 of a pitman 37, the latter being mounted upon the knife 14. Numeral 38 indicates a disk-wheel disposed in the housing-receptacle, said disk being provided with a crank 39 engaging the shuttle, and having a wrist-pin 40 disposed in the boss 41 of the cup-member *b*, roller members *e* being provided for said bearings, tending to prevent friction.

The housing-receptacle is adapted to contain oil for purposes of lubrication, and it will be understood that rotation of the wrist-pin 40 in either direction will cause longitudinal reciprocation of the knife 14. Numeral 42 indicates a connecting-rod for causing a rotation of the stub shaft 31, said connecting-rod consisting of the part 43 provided with a box 44, provided interiorly with parallel grooves 45, and a second part 46 which is provided with parallel ridges 47 for engaging in said grooves. The outer end of the part 43 of the connecting-rod 42 thus described, is flexibly coupled with the stub shaft 31 as indicated at 48 and the part 46 of the connecting-rod is flexibly coupled with the wrist-pin 40 as indicated at 49.

Since the parts 43 and 46 of the connecting-rod have a keyed connection, a limited rocking movement will be permitted for the shoe longitudinally of the line of travel, as above mentioned, this limited movement being required to permit the shoe to enter depressions. The movements for the parts mentioned will coöperate in a manner, during use, to permit free movements without undue vibration.

When the front part of the shoe swings downwardly or upwardly over uneven surfaces, the finger-bar will have a corresponding movement, the entire finger-bar being disposed near the ground, the part 46 or the two-part coupling-rod sliding a limited distance within the box 44. It will be noted that the parts operate automatically to cause the knife to work very near to the ground at all times, this being of great advantage in instances where the ground is rough.

Numeral 26 indicates a hand-lever for use of an operator to lift the underframe over obstructions. As best shown in Figs. 3 and 4, the two cup-members *b* and *d* are connected by bolts 50. Numeral 51 (Fig. 4.) indicates packing disposed in the packing-box 52, the latter being threaded on the segments 53 of members *b* and *d*. On account of this construction the housing-receptacle may contain lubricating oil.

The shoe 15 is provided with a suitable curved rod 54 for moving the grass or other crop to be severed, into the line of travel of the finger-bar and knife.

I claim:

1. A mowing machine comprising an overframe provided with a hub and pivotally connected with the frame of the machine, a shoe, a finger-bar mounted on the shoe, a knife on the finger-bar, a revoluble shaft having bearings in the hub, an oil-receptacle provided with guides and mounted on the shoe, an underframe axially mounted on the hub and pivotally connected with the oil-receptacle and having a pivotal connection with the overframe, a shuttle-head in the oil-receptacle engaging said guides and having a pitman connected with the knife, a second shaft having bearings in the wall of the oil-receptacle, a disk mounted on the second shaft and having a projection engaging the shuttle-head, and a longitudinally extensible shaft revoluble by the first named shaft for rotating the second shaft to cause reciprocation of the shuttle-head and said knife.

2. A mowing machine comprising an overframe provided with a hub and pivotally connected with the frame of the machine, a shoe, a finger-bar mounted on the shoe, a knife on the finger-bar, a revoluble shaft having bearings in the hub of the overframe, an underframe having an arm provided with branches and axially mounted on said hub, an oil-receptacle provided with guides and mounted on the shoe, said receptacle being disposed between and pivotally connected with the branches of said arm, a shuttle-head in the oil-receptacle engaging said guides and having a pitman connected with said knife, a second shaft having bearings in the wall of the oil-receptacle, a disk mounted on the second shaft and having a projection in engagement with the shuttle-head, and a longitudinally extensible shaft connected with the first named shaft and second shaft for communicating a revoluble movement of the first named shaft to the disk for reciprocating the shuttle-head and said knife.

In testimony whereof, I have affixed my signature in presence of two witnesses.

GEORGE A. GARRETT.

Witnesses:
GEO. H. GARRETT,
N. DELAVAN.